United States Patent [19]

Donjon et al.

[11] 4,002,902
[45] Jan. 11, 1977

[54] OPTICAL IMAGE CONVERTING RELAY HAVING AN ELECTRO-OPTICAL ELEMENT AND A PHOTOCONDUCTIVE ELEMENT

[75] Inventors: Jacques Donjon, Yerres; Michel Grenot, Brunoy; Jean-Pierre Hazan, Saint-Maur, all of France

[73] Assignee: U.S. Philips Corporation, New York, N.Y.

[22] Filed: Jan. 7, 1975

[21] Appl. No.: 539,060

Related U.S. Application Data

[63] Continuation of Ser. No. 382,397, July 25, 1973, abandoned.

[30] Foreign Application Priority Data

Aug. 2, 1972 France .............................. 72.27915

[52] U.S. Cl. .......................... 250/213 R; 250/330; 250/338
[51] Int. Cl.² ........................................ H01J 31/50
[58] Field of Search .... 250/330, 333, 338, 213 VT, 250/213

[56] References Cited

UNITED STATES PATENTS

| | | | |
|---|---|---|---|
| 3,784,831 | 1/1974 | Reif | 250/213 VT |
| 3,792,259 | 2/1974 | Donjon et al. | 250/213 VT |

*Primary Examiner*—Archie R. Borchelt
*Attorney, Agent, or Firm*—Frank R. Trifari; Simon L. Cohen

[57] ABSTRACT

In an optic relay device having a memory the image to be treated is projected on a photoconductive element and is transformed into a charge image stored in a memory in the proximity of a plate of electro-optical material brought at its Curie point.

The electro-optical material and the photoconductive element are such that the Curie temperature of the electro-optical material is near the temperature of the maximum sensitivity of the photoconductor.

2 Claims, 1 Drawing Figure

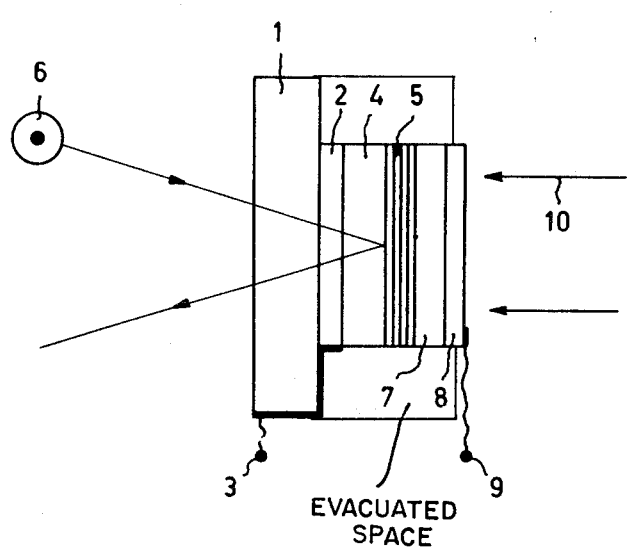
EVACUATED SPACE

OPTICAL IMAGE CONVERTING RELAY HAVING AN ELECTRO-OPTICAL ELEMENT AND A PHOTOCONDUCTIVE ELEMENT

This is a continuation of application Ser. No. 382,397, filed July 25, 1973, now abandoned.

The present invention is related to the invention disclosed in U.S. Pat. No. 3,792,259.

It relates to an improvement of an optical image converting device comprising at least a first source of a first radiation which may be a light radiation, visible infrared or ultraviolet, means for projecting or deflecting the said radiation, at least a second source of a second light radiation and an optical image relay constituted by an evacuated space having at least one window which is transparent to the said radiations, by a plate having an electro-optical effect brought at the temperature of its Curie point can having a double refraction which is variable as a function of the potential difference existing between its faces, a first electrode which is electrically conductive and optically transparent to the said second light radiation being disposed against the said plate and a second electrode being placed on the opposite side in the proximity of the said plate.

According to the present invention, a device of the said type is maintained to convert any image into an image of a determined spectrum, usually a visible image: the image to be treated, projected on a photoconductive layer is transformed into a charge image stored in a memory in the proximity of the electro-optical plate. Said charge image may be read by projecting it on a screen by means of a polarized light beam the wavelength of which may be chosen according to the intended use of the relay.

It is known that the sensitivity and the spectral response of photoconductive bodies depend considerably upon the temperature. During operation, the temperature of the photoconductive element is substantially that of the plate of electro-optical material, hence of the Curie point of the said material.

The invention is remarkable in that the electro-optical material and the photoconductive element are chosen to be so that the Curie temperature of the electro-optical material is as near as possible to the maximum sensitivity temperature of the photoconductive element in the band of the spectrum of the display light.

The invention proposes a few non-limiting embodiments in which the electro-optical and photoconductive elements are chosen for a given operating temperature and spectrum of the display light.

The invention will be better understood by means of the following description and the accompanying drawings having only one FIGURE on which is shown again the structure of the relay with photoconductor, it being understood that all the elements of the actual relay are inside a space not shown, comprising entrance windows for the radiation.

In the figure, reference numeral 1 denotes a sheet of material which is transparent to the reading light and which serves to support the assembly of the relay, 2 is a conductive layer or first electrode which is transparent to the light and permits the connection of the contact 3, 4 is a plate of electro-optical material, 5 is a multilayer dielectric mirror permitting the reflection of the light from the source 6, 7 is a photoconductive layer sensitive to the display light 10, 8 is a conductive layer or second electrode which is tranparent to the display light 10 and permits the connection of the contact 9.

As is the case with the image relay in U.S. Pat. No. 3,792,259 the changes in electrical field strength due to the interaction between the light pattern of the display light 10 and the photoconductive layer 7 causes local changes in the refractive index of the electrooptic material 4, which in turn result in local changes in the phase of the light passing through the electrooptic material. Thus, the image of an object (not shown) projected on to the photoelectric layer 7 with the radiation 10 is converted into a phase modulated radiation pattern of the light from source 6, the phase modulation corresponding to the image.

In an embodiment, deuterated diacid potassium phosphate brought to its Curie point is used as an electro-optical material. It is known that said Curie point varies considerably with the deuteration level. Thus when the deuteration level varies from 0% to substantially 100%, the Curie temperature varies from approximately $-150°$ C to $-50°$ C. In said temperature range a certain number of photoconductors may be used according to the spectrum of the display light. For example, in the case of conversion of infrared images, lead sulphate (PbS) may be chosen as a photoconductive material. In the above temperature range there exists a threshold below which the resistivity of the PbS layer is sufficiently large for the system to have a good sensitivity without for that reason its time constant becoming prohibitive. Table I below indicates the deuteration levels and the operating temperatures adapted to the conversion of infrared images of wavelength $\lambda$ which are equal to 2.8 $\mu$ and 3.5 $\mu$, respectively.

TABLE I

| $\lambda$ (micron) | operating temperature (° C) | deuteration level |
| --- | --- | --- |
| 2.8 | $-80°$ C | 70 % |
| 3.5 | $-140°$ C | 10 % |

Table 2 indicates, non-limitatively, photoconductors which may be used according to the invention as a function of the deuteration levels and of the spectrum of the wavelength $\lambda$ of the display light.

Table 2.

| Photoconductor | $\lambda$ (micron) | operating temperature (° C) | deuteration level |
| --- | --- | --- | --- |
| ZnS | 0.3 | $-50°$ C | 100 % |
| PbTe | 1.5 | $-80°$ C | 70 % |
|  | 2 | $-150°$ C | 0 % |
| Te | 3 | $-130°$ C | 20 % |
| PbSe | 3.5 | $-78°$ C | 70 % |

What is claimed is:

1. An optical image converting relay device of the type comprising a first source of a first radiation in the portion of the spectrum including infrared, visable and ultraviolet radiation, termed display radiation, a second source of a second light radiation, termed reading light, an optical image relay constituted by an evacuated enclosure having at least one window which is transparent to the said radiations, a photoconductive layer which is sensitive to the said first radiation aligned with said window in said relay, a plate in said relay having an electro-optical effect brought at the temperature of its Curie point and having a double refraction which is variable in accordance with an electrical potential difference existing between its faces, a first electrode which is electrically conductive and optically transparent to the said second light radiation on said plate, a second electrode on the opposite side of said plate, the improvement wherein the Curie temperature of the plate and the operating temperature of the relay are substantially that of the maximum sensitivity of the photoconductive larger in the band of the spectrum of the display light, whereby an image of an object projected on to said photoconductive larger with said second radiation is converted into phase modulated radiation in the portion of the spectrum of the first radiation, the modulation corresponding to the image.

2. An optical image converting relay device as claimed in claim 1, wherein the plate is deuterated diacid potassium phosphate in such proportions that the temperature of its Curie point is also substantially that of the maximum sensitivity of the photoconductive larger in the band of the display light.

* * * * *

UNITED STATES PATENT AND TRADEMARK OFFICE
CERTIFICATE OF CORRECTION

PATENT NO. : 4,002,902
DATED : January 11, 1977
INVENTOR(S) : JACQUES DONJON ET AL It is certified that error appears in the above-identified patent and that said Letters Patent are hereby corrected as shown below:

Col. 1, line 17, after "by a" insert --photoconductive layer which is sensitive to said first radiation, by a--;

Claim 1, line 21, "larger" should be --layer--;

line 23, "larger" should be --layer--;

Claim 2, line 6, "larger" should be --layer--;

Signed and Sealed this

Twenty-ninth Day of March 1977

[SEAL]

Attest:

RUTH C. MASON
*Attesting Officer*

C. MARSHALL DANN
*Commissioner of Patents and Trademarks*